United States Patent [19]
Pedersen

[11] Patent Number: 4,730,684
[45] Date of Patent: Mar. 15, 1988

[54] VEHICLE

[76] Inventor: Borge Pedersen, 12 Principal Rd., Unit 2, Scarborough, Ontario, Canada, M1R 4Z3

[21] Appl. No.: 888,182

[22] Filed: Jul. 22, 1986

[51] Int. Cl.⁴ ............................................. B62D 61/10
[52] U.S. Cl. ...................................... 180/22; 180/8.2; 180/24.08; 280/DIG. 10
[58] Field of Search ................ 180/21, 22, 8.2, 24.08; 280/DIG. 10

[56] References Cited

U.S. PATENT DOCUMENTS

| | | | |
|---|---|---|---|
| 1,392,904 | 10/1921 | Arons | 180/24 |
| 1,644,978 | 10/1927 | Childers | 180/24.08 |
| 2,821,949 | 2/1958 | Uyehara | 180/22 |

FOREIGN PATENT DOCUMENTS 429155 1/1948 Italy ................................ 180/24.08

Primary Examiner—David M. Mitchell
Assistant Examiner—Kenneth R. Rice
Attorney, Agent, or Firm—Rogers, Bereskin & Parr

[57] ABSTRACT

A wheel vehicle for traversing rough uneven terrain. One set of load bearing wheels is used in conjunction with secondary wheels that are placed such that the secondary wheels bridge the spacing between the load bearing wheels below the horizontal axis of the load bearing wheels sufficiently to prevent any ground projection from engaging such a space to impede movement of the vehicle.

13 Claims, 4 Drawing Figures

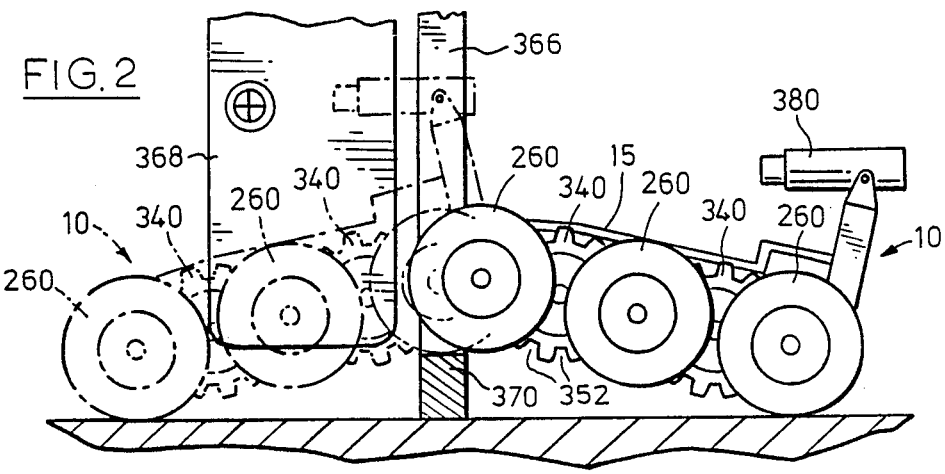
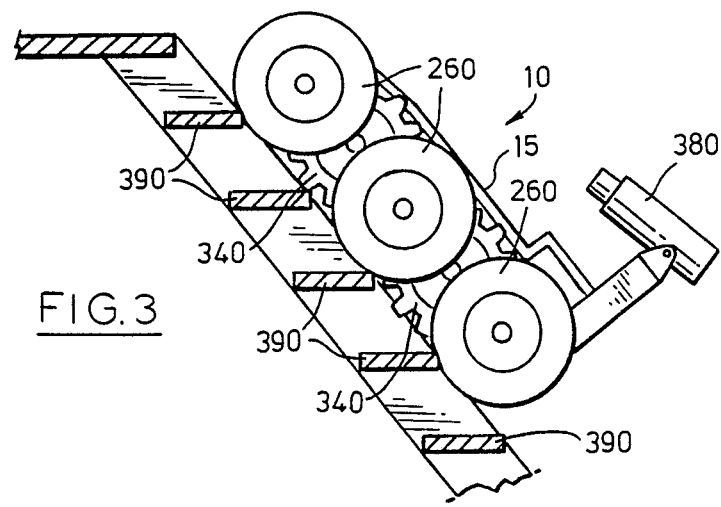
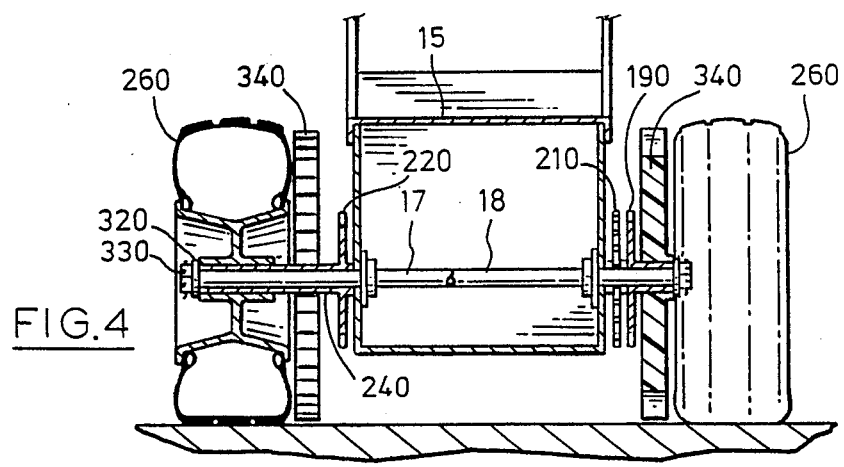

VEHICLE

FIELD OF INVENTION

The present invention relates to a vehicle. The present invention is more particularly concerned with a wheel arrangement that will enable a wheeled vehicle to travel over obstacles.

DESCRIPTION OF PRIOR ART

At the present time, there are a large variety of wheeled vehicles. Vehicles for use in urban environments are satisfactory on paved surfaces. However, many vehicles have suffered from problems in dealing with uneven or sharply differentiated surfaces. Standard wheel vehicles face particular problems when encountering severely varying terrain. To accomodate uneven ground or soft ground, vehicles have been provided with numerous closely spaced wheels. This can spread the vehicle load and enable a vehicle to travel on many types of terrain. Where a protrusion in the terrain exceeds the distance from the axle to the bottom of the wheel, it often stops the vehicle. Whilst the front wheels of a vehicle may climb over the protrusion, the protrusion can then enter the space between the front wheels and the next pair of wheels. The protrusion may then engage the vehicle body so that the vehicle pivots on the protrusion. Alternatively, vehicle characteristice may be such as to prevent the next pair of wheels from climbing over the protrusion.

Stairs or steps also present a problem to wheeled vehicles, particularly small, wheeled vehicles. Small robot vehicles often have a close wheel spacing that matches that of certain steps. This can cause the vehicle to be stopped with each pair of its wheels on the top of a step abutting the next step.

It has been proposed to use endless tracks to overcome this problem. Many vehicles, such as military tanks and tractors for agricultural or construction uses, are fitted with tracks. These are all large vehicles. However, the expense and effort involved in producing and maintaining a track vehicle, coupled with problems encountered with the track slipping, make wheeled vehicles more attractive for many purposes. For small light vehicles, tracks have disadvantages. Dirt and snow or ice tend to build up between the tracks and the supporting wheels. Ultimately, this can cause the track to be displaced.

SUMMARY OF INVENTION

It is desirable to provide a wheeled vehicle that can travel across a variety of uneven terrain. More particularly, for small vehicles, it is desirable that they should have a wheel arrangement that enables them to climb stairs or steps and travel over vertically extending plates and the like within certain height limits.

In accordance with the present invention, there is provided a vehicle comprising a body; a plurality of load bearing wheels rotatably mounted about respective first axes to the chasis to support the vehicle; and at least one secondary wheel which is rotatably mounted to the vehicle about a respective second axis and which secondary wheel extends below the axes of a pair of longitudinally spaced first wheels and overlaps the adjacent first wheels sufficiently to prevent a ground projection extending vertically and horizontally across the vehicle path from engaging a space between adjacent wheels to impede movement of the vehicle.

BRIEF DESCRIPTION OF THE DRAWINGS

For a better understanding of the present invention and to show more clearly how it may be carried into effect, reference will now be made, by way of example, to the accompanying drawings which show a preferred embodiment of the invention and in which:

FIG. 2 is a side view of the vehicle of FIG. 1;

FIG. 3 is a side elevational view of the vehicle climbing a set of conventional stairs;

FIG. 4 is a split cross-sectional view along line 4—4 of FIG. 1.

DETAILED DESCRIPTION OF THE PERFERRED EMBODIMENT

Figure 1:
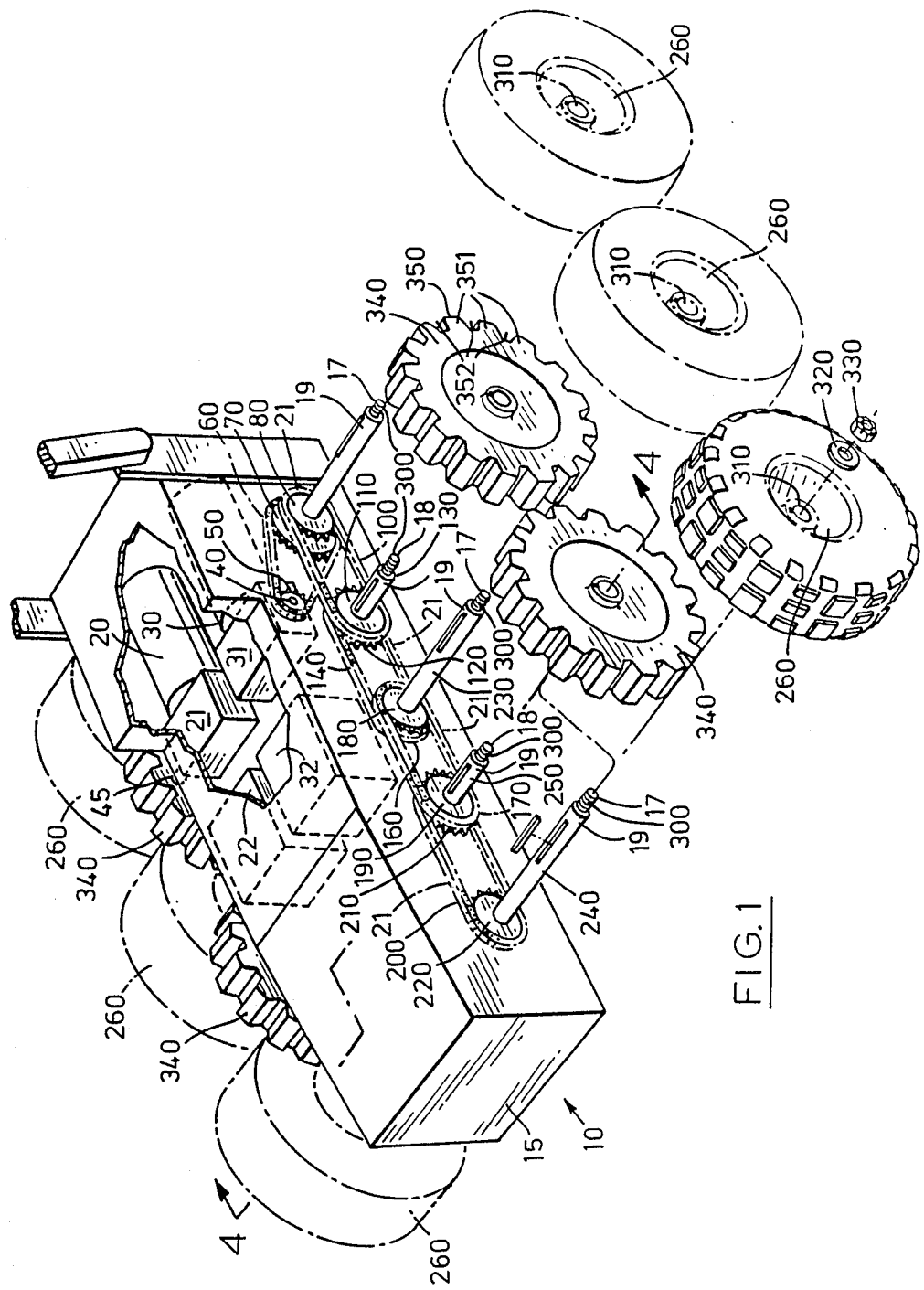
FIG. 1 is an exploded perspective view of a vehicle according to the present invention.

Referring to FIG. 1, it will be seen that a vehicle 10 has a body 15. Load bearing wheel axles 17 and secondary wheel axles 18 extend through and protrude on either side of body 15. Drive transfer members 19 are placed over secondary wheel axles 18 and load bearing wheel axles 17. The drive transfer members 19 are linked and driven by a series of chains 21. The vehicle may be equipped with two internal electric motors 20 and 30. These motors may be independently controlled using conventional electronic or hydraulic means. The motors 20, 30 are provided with respective gear boxes 21, 31 and power supplies, e.g. batteries or accumulators, 22, 32. These later components are shown schematically.

The vehicle 10 shown is intended for use as a robot and, as such, it would be controlled remotely by means of a cable or the like. It has relatively small dimensions and would be approximately 4 feet in length. It can be provided with any desired equipment, such as a television camera, an X-ray device, or a weapon.

Each motor 20 or 30 drives a respective drive shaft 40 which in turn acts as a driving axle for a sprocket wheel 50 which is integrally mounted thereon.

A first linking chain 60 links the sprocket wheel 50 to a large sprocket wheel 70. The large sprocket wheel 70 and a first drive transfer sprocket wheel 80 are integrally mounted to a long hollow tube shaft 90, forming a first device transfer member 19.

The first drive transfer sprocket wheel 80 is linked by a second linking chain 100 to a second drive transfer sprocket wheel 110. The second drive transfer sprocket wheel 110 is integrally mounted with a third drive transfer sprocket wheel 120. Both the second drive transfer sprocket wheel 110 and the third drive transfer sprocket wheel 120 are integrally mounted about a shorter hollow tube shaft 130 forming a second drive transfer member 19.

Correspondingly, a third linking chain 140 links the third drive transfer sprocket wheel 120 to a fourth drive transfer sprocket wheel 160. Similarly, a fourth linking chain 170 links a fifth drive transfer sprocket wheel 180 to a sixth drive transfer sprocket wheel 190, the fourth and fifth drive transfer sprocket wheels 160, 180 being integrally mounted. Lastly, a fifth linking chain 200 links a seventh drive transfer sprocket wheel 210 to and end drive sprocket wheel 220, with the sixth and seventh drive transfer sprocket wheels 190, 210 being integrally mounted.

The sprocket wheels 50, 70, 80, 110, 120, 160, 180, 210 and 220 are all generally similar. With the exception of the sprocket wheels 50, 70, these sprocket wheels are all the same size.

The fourth drive transfer sprocket wheel 160 and the fifth drive transfer sprocket wheel 180 are integrally mounted to each other about second long hollowed tube shaft 230 in a similar fashion as large sprocket wheel 70 and the drive transfer sprocket wheel 80. The end drive sprocket wheel 220 is similarly mounted to a third long hollow tube shaft 240.

The long hollow tube shafts 90, 230 and 240 are similar to one another.

The sixth and seventh drive transfer sprocket wheels 190, 210 are mounted to each other about second shorter hollow tube shaft 250, which is similar to shorter hollow tube shaft 130.

Load bearing wheels 260 are mounted to the long hollow tube shafts 90, 230 and 240, using a conventional slot 270 and key locking apparatus 280.

The drive transfer members 19 are placed over both load bearing wheel axles 17 and secondary wheel axles 18 leaving threaded end portions 300 of the axles exposed. The threaded portions 300 pass through orifices 310 in the wheels 260. A washer 320 and nut 330 hold each wheel 260 and its drive transfer member 19 on its load bearing axle 17, as shown in the left hand side of FIG. 4. Secondary wheels 340 are similarly mounted on the secondary wheel axles 18.

Having reference to the right hand side of FIG. 4, the secondary wheel axle 18 can be seen inside a shorter hollow tube shaft 250 and is held in place by a respective nut 330 and washer 320.

The wheels 260 are conventional pneumatic wheels. Each wheel 260 has an external diameter of 350 mm and a width of approximately 110 mm, and as shown can be provided with a tread. The axles 17 are in a common plane and spaced by 380 mm, thus providing a narrow approximately 30 mm gap between adjacent wheels 260. The secondary wheels 340 are solid and disc shaped as indicated. Each wheel 340 has a diameter of 330 mm and a width of 38 mm. The wheels 340 have their axles 18 in the same plane as the axles 17. Consequently, on flat ground, the secondary wheels 340 are spaced around 10 mm from the ground. The wheels 340 are formed from a rubber or plastic compound having the desired degree of resiliency. As shown, they are provided with a toothed periphery 350, having teeth 351 and recesses 352. Each tooth can have an outer surface that is 32 mm in length and a depth of 25 mm. The sides of each recess 352 include an angle of 45°. Whilst generally trapezoidal teeth and recesses are shown, other shapes are possible. Thus, the teeth and/or recesses could be rounded.

It will be appreciated that as the secondary wheels 340 are of smaller diameter than load bearing wheels 260, over flat terrain, the secondary 340 do not come in contact with the ground. Alternatively, the secondary wheel axles 18 may be raised above load bearing wheel axles 17 to accomplish this same purpose with all the wheels being of the same diameter.

Small remotely controlled robots are often required to enter places where there are numerous obstacles. Robots are used because, for various reasons, human personnel cannot enter the area. Accordingly, it is absolutely essential that the vehicle operate reliably, and it should not become trapped on any obstacle. Thus such wheeled robots are used in nuclear power installations, in military installations, and to assist in arresting or disarming an armed terrorist or the like without endangering life.

With regard to military uses, it has been proposed to use such wheeled robots in ships. Now, a common feature in ship design is a bulkhead door, and such a bulkhead door is shown in FIG. 2. The bulkhead is shown at 366 and the door at 368. In known manner, the door 368 is set quite high. The bulkhead 366 thus has a lip or vertical flange 370 over which the vehicle 10 has to travel. This presents problems for a conventional vehicle, as the flange 370 tends to get caught between adjacent pairs of wheels, preventing further movement of the vehicle 10.

Referring to FIG. 2, when the vehicle 10 reaches the flange 370, the forward pair of wheels 260 engage the top of the flange 370 and lift the vehicle 10 up. The front wheels 260 then travel over the flange 370. The first pair of secondary wheels 340 then engage the flange 370 and prevent the flange entering the gap between the first two pairs of wheels 260. The recesses 352 of the secondary wheels 340 engage the flange 370 and propel the vehicle 10 forward, with the middle pair of wheels 260 reach the flange 370. The middle pair of wheels 260 then travel over the flange 370. For an even weight distribution, at this point, the vehicle will rock forwards, the rearmost wheels 260 leaving the deck and the foremost wheels 260 belting down to the deck on the other side of the bulkhead. The rearmost wheels 260 and 340 then traverse the flange 370 in a similar manner.

FIG. 2 also shows a video camera 380 that may be attached to the vehicle as an aide in guiding the vehicle by remote control.

Another maneuver that frequently causes difficulty for small wheeled vehicles is climbing stairs or steps. If the step spacing matches the wheel spacing, then the wheels can become trapped. Each pair of load bearing wheels 260 is on a step abutting the next step, preventing further movement.

Reference will be made to FIG. 3, which shows how the vehicle 10 traverses steps 390. The secondary wheels 340 engage the outer edges of steps 390 and in conjunction with load bearing wheels 260, thereby allowing the vehicle to climb unhindered up a steeply sloped set of stairs without becoming entrapped in the intervening spaces or slipping down the incline. As seen in the side view of FIG. 3, the spaces between the wheels 260, 340 are insufficient to enable the steps 390 to engage the wheels and stop the vehicle 10.

In operation, electric motors 20 to 30 are independently controlled so that the direction of rotation of drive shaft 40 may be modified independently of the direction of rotation of drive shaft 45. Accordingly, when direction of rotation of drive shaft 40 is reversed relative to the direction of rotation of drive shaft 45, the vehicle will rotate and can be steered.

The linking chains 21 driven by drive sprocket 50 rotate the drive transfer members 19 on one side of the body 15 relative to the load bearing axles 17 and secondary wheel axles 18. Both the secondary wheels 340 and load bearing wheels 260 on each side rotate in the same direction at all times and are locked to the drive transfer members 19 which turn freely over the stationary axles.

It will be appreciated that the embodiment shown here is but one of a number of preferred embodiments employing the invention disclosed herein. For example, alternate control means, and steering means may be employed which require only one motor. In addition, suspension means may be introduced and the shaft driven apparatus may be modified, using a split axle, to run directly off of axle drive.

I claim:

1. A vehicle comprising a body; a plurality of first load bearing wheels rotatably mounted about respective first axes to a chassis to support the vehicle; and at least one secondary wheel which is rotatably mounted to the vehicle about a respective second axis, said second axis positioned longitudinally between the said first axes, and which secondary wheel extends below the axis of a pair of longitudinally spaced first wheels and overlaps the adjacent first wheels sufficiently to prevent a ground projection extending vertically and horizontally across the vehicle path from engaging a space between adjacent wheels to impede movement of the vehicle, wherein the lowermost part of each secondary wheel is above the lowermost parts of the adjacent load bearing wheels, and wherein the diameter of each secondary wheel is less than the diameter of the adjacent load bearing wheels, and the axis of rotation of the secondary and adjacent load bearing wheels are in the same horizontal plane.

2. A vehicle comprising a body; a plurality of load bearing wheels rotatably mounted about respective first axes to the chassis to support the vehicle; and at least one secondary wheel which is rotatably mounted to the vehicle about respective second axes, said second axis positioned longitudinally between said first axes, and which secondary wheel extends below the axis of a pair of longitudinally spaced first wheels and overlaps the adjacent first wheels sufficiently to prevent a ground projection extending vertically and horizontally across the vehicle path from engaging a space between adjacent wheels to impede movement of the vehicle, wherein the lowermost part of each secondary wheel is above the lowermost parts of the adjacent load bearing wheels, and wherein the axis of rotation of the or each secondary wheel is positioned relatively above the axis of rotation of the said adjacent load bearing wheels, and the diameter of the or each secondary wheel is identical to the diameter of the adjacent load bearing wheels.

3. A vehicle as claimed in claim 1 which includes at least three pairs of load bearing wheels and a plurality of pairs of secondary wheels, and the wheels on each pair being rotatably mounted on a common axle on either side of the vehicle, wherein between all adjacent pairs of load bearing wheels there is provided a pair of secondary wheels, the axles are all spaced by the same amount from one another and lie in a common plane, and the secondary wheels are located inside the load bearing wheels between the load bearing wheels and the chassis.

4. A vehicle as claimed in claim 3, wherein each secondary wheel is solid and generally disc-shaped.

5. A vehicle as claimed in claim 4, wherein each secondary wheel is formed from a resilient material and includes a toothed periphery.

6. A vehicle as claimed in claim 1, or 2, which includes a plurality of pairs of load bearing wheels and a plurality of pairs of secondary wheels, with the wheels of each pair being mounted on a common axle on opposite sides of the body of the vehicle.

7. A vehicle as claimed in claim 1 or 2, wherein each secondary wheel is solid.

8. A vehicle as claimed in claim 1 or 2, wherein the said secondary and load bearing wheels are simple single wheels and are substantially similar to each other.

9. A vehicle as claimed in 3, 4, or 5, wherein the difference between the spacing between the axles and the radius of the load bearing wheels are less than one tenth of the radius of the load bearing wheels.

10. A vehicle as claimed in claim 3, 4, or 5, wherein the load bearing wheels are pneumatic wheels.

11. A vehicle as claimed in claims 1, 3 or 4 which include a drive means mounted in the body for driving said load bearing and alternate wheels; and a steering means for directing said vehicle along a path.

12. A vehicle as claimed in claims 1, 3 or 4, which includes a drive means mounted within said body for driving the load bearing and secondary wheels and comprising:

(a) an electric motor
(b) a drive shaft driven by the said electric motor, on which a sprocket wheel is mounted;
(c) a plurality of drive transfer members rotatably mounted on the axles, upon which the load bearing and secondary wheels are mounted, the drive transfer member including sprocket wheels; and
(d) a plurality of chains mounted on the sprocket wheels to transfer drive from the electric motor to all the load bearing and secondary wheels.

13. A vehicle comprising a body; at least three pairs of load bearing wheels rotatably mounted about respective first axes to the chassis to support the vehicle, the load bearing wheels having their lowermost portions in a common ground plane; and a plurality of pairs of secondary wheels rotatably mounted to the vehicle about respective second axes, each second axis being positioned longitudinally between two adjacent first axes with the first and second axes alternating, and each of which secondary wheel extends below the axes of each of longitudinally adjacent first wheels, overlaps the adjacent first wheels sufficiently to prevent a ground projection extending vertically and horizontally across the vehicle path from engaging a space between adjacent wheels to impede movement of the vehicle, and has a lowermost part spaced above the ground plane.

* * * * *